United States Patent
Ganesan et al.

(10) Patent No.: US 12,468,778 B2
(45) Date of Patent: Nov. 11, 2025

(54) GENERATION OF TRAINING DATA FROM REDACTED INFORMATION

(71) Applicant: International Business Machines Corporation, Armonk, NY (US)

(72) Inventors: Balaji Ganesan, Bengaluru (IN); Kalapriya Kannan, Bangalore (IN); Neeraj Ramkrishna Singh, Bangalore (IN); Shettigar Parkala Srinivas, Bangalore (IN); Hima Patel, Bengaluru (IN); Soma Shekar Naganna, Bangalore (IN); Berthold Reinwald, San Jose, CA (US); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 151 days.

(21) Appl. No.: 17/119,247

(22) Filed: Dec. 11, 2020

(65) Prior Publication Data
US 2022/0188567 A1 Jun. 16, 2022

(51) Int. Cl.
*G06F 40/284* (2020.01)
*G06F 18/214* (2023.01)
(Continued)

(52) U.S. Cl.
CPC ...... *G06F 18/2148* (2023.01); *G06F 21/6254* (2013.01); *G06F 40/166* (2020.01); *G06F 40/284* (2020.01); *G06N 3/02* (2013.01)

(58) Field of Classification Search
CPC ... G06K 9/6257; G06F 40/284; G06F 40/166; G06F 21/6254; G06N 3/02
(Continued)

(56) References Cited

U.S. PATENT DOCUMENTS

2017/0091320 A1* 3/2017 Psota .................... G06F 16/313
2018/0052932 A1* 2/2018 Catalano .......... G06F 16/24575
(Continued)

FOREIGN PATENT DOCUMENTS

CN 106610943 A * 5/2017
CN 111008447 A 4/2020

OTHER PUBLICATIONS

Lingraj S. Vannur et al., "Data Augmentation for Personal Knowledge Graph Population", ArXiv, Feb. 23, 2020, IBM Research, 8 pages, arXiv:2002.10943v1 [cs.IR].
(Continued)

*Primary Examiner* — Stephen S Hong
*Assistant Examiner* — Tionna M Burke
(74) *Attorney, Agent, or Firm* — Anthony Curro

(57) ABSTRACT

One embodiment provides a computer implemented method, including: obtaining an information document corresponding to an entity, wherein the information document includes redacted information spans; identifying an entity type for each of the redacted information spans, wherein the entity type identifies a relationship between a redacted information span and at least one other entity within the information document; replacing the redacted information spans with replacement entities corresponding to the entity type of a given redacted information span, wherein the replacing is performed in view of a frequency distribution of actual information and wherein the replacing includes maintaining relationships of the redacted information spans; and controlling bias within the replacement entities, wherein the controlling includes detecting bias within the replacement entities.

18 Claims, 4 Drawing Sheets

(51) Int. Cl.
  *G06F 21/62* (2013.01)
  *G06F 40/166* (2020.01)
  *G06N 3/02* (2006.01)
(58) Field of Classification Search
  USPC .......................................................... 706/12
  See application file for complete search history.

(56) References Cited

U.S. PATENT DOCUMENTS

2018/0349786 A1  12/2018  Kovacs
2021/0073461 A1*  3/2021  Heckel ................... G06N 3/045

OTHER PUBLICATIONS

Junxing Zhu et al., "Constrained Active Learning for Anchor Link Prediction Across Multiple Heterogeneous Social Networks", Sensors, Aug. 3, 2017, 19 pages, MDPI.

Peng Zhang et al., "Measuring the robustness of link prediction algorithms under noisy environment", Scientific Reports, Jan. 6, 2016, 7 pages, www.nature.com/scientificreports.

Aditya Grover et al., "Bias Correction of Learned Generative Models using Likelihood-Free Importance Weighting", 33rd Conference on Neural Information Processing Systems (NeurIPS 2019), Nov. 3, 2019, Vancouver, Canada, 18 pages, arXiv: 1906.09531v2 [stat.ML].

Brian Hu Zhang et al., "Mitigating Unwanted Biases with Adversarial Learning", AIES '18, Feb. 2-3, 2018, New Orleans, LA, USA, 6 pages, ACM Digital Library.

Rachel K. E. Bellamy et al., "AI Fairness 360: An Extensible Toolkit for Detecting, Understanding, and Mitigating Unwanted Algorithmic Bias", Oct. 3, 2018, 20 pages, arXiv:1810.01943v1 [cs.AI].

Laura Avino et al., "Generating Synthetic but Plausible Healthcare Record Datasets", MLMH 2018, London, UK, 5 pages, arXiv:1807.01514v1 [stat.ML].

Riddhiman Dasgupta et al., "Fine Grained Classification of Personal Data Entities", 2019, Association for the Advancement of Artificial Intelligence, 8 pages, arXiv:1811.09368v1 [cs.CL].

Gallagher, arsTECHNICA, Researchers, scared by their own work, hold back "deepfakes for text" AI, Feb. 15, 2019, Accessed/Printed on May 28, 2024, pp. 1-5.

D'Avatar—Reincarnation of personal data entities in unstructured data sets ICADABAI Jan. 29, 2019-Mar. 12, 2019, 06 pages, https://sites.google.com/iimahd.ernet.in/hackathon-icadabai2019/home.

* cited by examiner

GENERATION OF TRAINING DATA FROM REDACTED INFORMATION

BACKGROUND

Machine learning is the ability of a computer to learn without being explicitly programmed to perform some function. Thus, machine learning allows a programmer to initially program an algorithm that can be used to predict responses to data, without having to explicitly program every response to every possible scenario that the computer may encounter. In other words, machine learning uses algorithms that the computer uses to learn from and make predictions with regard to data. Machine learning provides a mechanism that allows a programmer to program a computer for computing tasks where design and implementation of a specific algorithm that performs well is difficult or impossible. To implement machine learning, the computer is initially taught using machine learning models that have been trained utilizing sample inputs or training data. The computer can then learn from the machine learning model in order to make decisions when actual data are introduced to the computer.

BRIEF SUMMARY

In summary, one aspect of the invention provides a computer implemented method, including: obtaining an information document corresponding to an entity, wherein the information document includes redacted information spans; identifying an entity type for each of the redacted information spans, wherein the entity type identifies a relationship between a redacted information span and at least one other entity within the information document; replacing the redacted information spans with replacement entities corresponding to the entity type of a given redacted information span, wherein the replacing is performed in view of a frequency distribution of actual information and wherein the replacing includes maintaining relationships of the redacted information spans; and controlling bias within the replacement entities, wherein the controlling includes detecting bias within the replacement entities.

Another aspect of the invention provides an apparatus, including: at least one processor; and a computer readable storage medium having computer readable program code embodied therewith and executable by the at least one processor: wherein the computer readable program code is configured to obtain an information document corresponding to an entity, wherein the information document includes redacted information spans; wherein the computer readable program code is configured to identify an entity type for each of the redacted information spans, wherein the entity type identifies a relationship between a redacted information span and at least one other entity within the information document; wherein the computer readable program code is configured to replace the redacted information spans with replacement entities corresponding to the entity type of a given redacted information span, wherein the replacing is performed in view of a frequency distribution of actual information and wherein the replacing includes maintaining relationships of the redacted information spans; and wherein the computer readable program code is configured to control bias within the replacement entities, wherein the controlling includes detecting bias within the replacement entities.

An additional aspect of the invention provides a computer program product, including: a computer readable storage medium having computer readable program code embodied therewith, the computer readable program code executable by a processor: wherein the computer readable program code is configured to obtain an information document corresponding to an entity, wherein the information document includes redacted information spans; wherein the computer readable program code is configured to identify an entity type for each of the redacted information spans, wherein the entity type identifies a relationship between a redacted information span and at least one other entity within the information document; wherein the computer readable program code is configured to replace the redacted information spans with replacement entities corresponding to the entity type of a given redacted information span, wherein the replacing is performed in view of a frequency distribution of actual information and wherein the replacing includes maintaining relationships of the redacted information spans; and wherein the computer readable program code is configured to control bias within the replacement entities, wherein the controlling includes detecting bias within the replacement entities.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
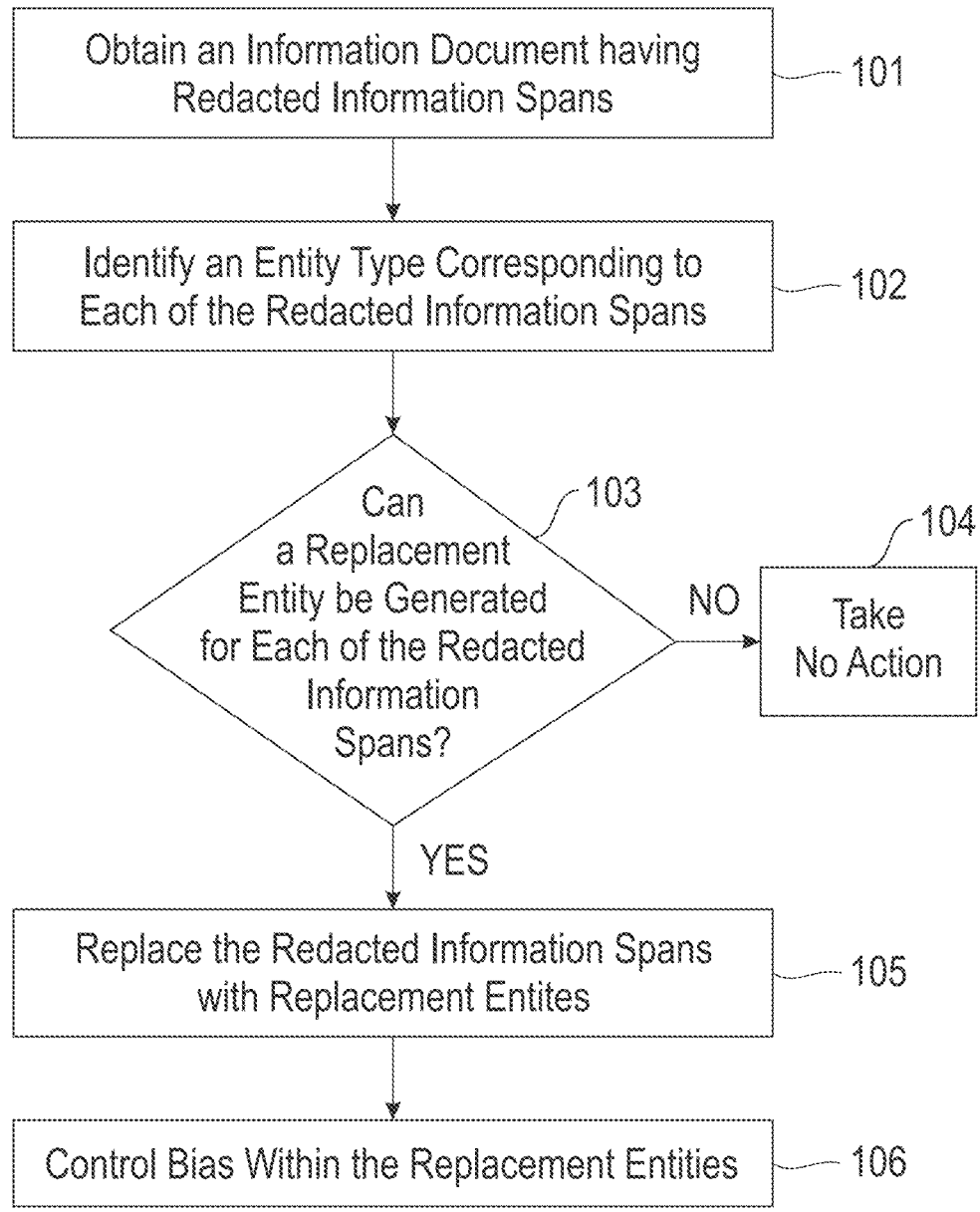
FIG. 1 illustrates a method of generating machine-learning model training data from information documents having redacted information by generating replacement entities for the redacted information where the replacement entities maintain the relationships or links between entities of the original information document and controlling bias within the generation of the replacement entities.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

The generation of training data for a machine-learning model is a complex and time-consuming task. Data has to be obtained and then annotated so that the model can utilize the data to learn attributes about the data. Depending on the type or purpose of the machine-learning model that is being trained, different training data are necessary. For example, a machine-learning model that classifies images will need labelled images for training data. As another example, a machine-learning model that makes predictions regarding loan approvals needs previous loan approval process training data. Many times machine-learning models are employed in use cases that require the model to make predictions about people or decisions affecting or including people. Thus, the training data generally has real-world information regarding real people. The problem with this is that the developers and entities that utilize the training data are now being exposed to real information about real people, even if that information may be sensitive or personal.

One technique for addressing the personal or sensitive information exposure is to redact the personal or sensitive information. The problem with this approach in training machine-learning models is the redacted document(s) may not provide enough information to accurately train the machine-learning model. Additionally, in the event that the redacted information is replacement information instead of a full redaction, the replacement information does not maintain any relationships between the entities included in the redacted information. For example, in a situation where all names are changed to a generic name, any relationships between people have now been eliminated or obfuscated. This again leads to the problem that the machine-learning model is trained inaccurately. Another technique for addressing the personal or sensitive information exposure is to only use publicly available information. The problem with this approach is that, while the information is publicly available, it may still not be desirable to the person to have their personal information used within training data.

Accordingly, an embodiment provides a system and method for generating machine-learning model training data from information documents having redacted information by generating replacement entities for the redacted information where the replacement entities maintain the relationships or links between entities of the original information document and controlling bias within the generation of the replacement entities. The system obtains an information document corresponding to an entity (e.g., person, object, location, products, institutions, etc.) and that contains redacted information spans. The redacted information may include fully removed information or may include replacement information. The redacted information document may include a document that was received already having redacted information or may include the system creating a redacted information document from an unredacted information document.

The system identifies an entity type for each of the redacted information spans. An entity type identifies an entity category of the information span, for example, person, location, institution, object, and the like. The entity type also identifies a relationship between redacted information spans or a redacted information span and other entities within the information document. Thus, the entity type may be a fine-grained entity type, for example, mother, father, place of employment, birthplace, spouse, job position, founded date, location of origination, and the like. The system replaces the redacted information with replacement entities corresponding to the entity type of the redacted information span. The replacement entities are selected while taking into account a frequency distribution of actual information. For example, taking into account all replacement entities across a plurality of documents, a last name having a high frequency in the actual population will occur at a similar frequency within the replacement entities. Additionally, the replacement entities are selected such that relationships between redacted information are maintained. For example, when a last name of a child having the same last name as a parent is replaced, when the parent's last name is replaced, it will be replaced with the same last name in order to maintain the relationship from the unredacted information.

Additionally, in order to control bias within the documents, the system detects bias within the replacement entities. This detection may include converting the unstructured data of the document into a structured dataset. A structured dataset bias detector can then be utilized on the structured dataset to detect any bias present within the replacement entities. Since the bias is now known, a user or developer can then determine whether the bias should be maintained, decreased, or eliminated altogether. This determination can be made based upon the purpose of the machine-learning model that the data will be used to train.

Such a system provides a technical improvement over current systems for generation of machine-learning model training data. The described system provides a technique for generating training data such that any personal or sensitive information is not included within the training data, but any relationships between entities included in the personal or sensitive information are maintained. This allows for more accurate training data generation than conventional techniques where the personal or sensitive information is fully redacted or replaced with generic information. Additionally, the system provides a technique for controlling bias that is included in the information documents. Thus, if the machine-learning model developer needs biased information, the bias can be maintained within the training, or if the machine-learning model developer needs unbiased information, the bias can be removed completely from the training data. This results in training data that does not unintentionally introduce bias into the machine-learning model, as opposed to traditional techniques where the bias is left uncontrolled. Accordingly, the described system and method provides a technique that allows for generation of more accurate and controlled training data since entity relationships are maintained while ensuring that personal and sensitive information is kept private and bias is controlled, as opposed to conventional techniques.

FIG. 1 illustrates a method for generating machine-learning model training data from information documents having redacted information by generating replacement entities for the redacted information where the replacement entities maintain the relationships or links between entities of the original information document and controlling bias within the generation of the replacement entities. At 101 the system obtains an information document corresponding to an entity and having redacted information spans. The entity may be any type of entity, for example, person, object, institution, place, location, idea, or the like. The information spans may represent entities within the document, for example, people, locations, objects, institutions, ideas, jobs, and the like. The information spans may also represent personal or sensitive information, for example, a name of a person, a job of a person, a birthplace, a date of foundation, contributing people, or the like, which does not necessarily mean that the information is confidential. Thus, while the information spans may include publicly available information, the information is considered private or sensitive because it is unique to the entity that is the subject of the information document.

Obtaining the information document may include any technique for obtaining documents, for example, a user providing the information document or a pointer thereto to the system, the system accessing a data storage location containing information documents, or the like. Obtaining the information document may include another entity providing the information document to the system or may include the system generating the information document. A redacted information span, regardless of the entity performing the redacting, may include information spans that are completely removed or obfuscated or may include replacement information spans. The replacement information spans may be generic information spans, for example, a name replaced with a generic name.

Depending on how the information document is obtained may dictate whether the information spans are already redacted within the document or whether the system redacts the information spans. For example, if the information document is received from another entity, the information document may include already redacted information spans. However, if the system is generating the information document, the system may redact the information spans. To generate the redacted information document, the system may obtain an unredacted information document, for example, a publicly available document, an unredacted document from another entity, or the like. The system may then perform entity identification to identify entities within the document, for example, utilizing information extraction, semantic or syntactic analysis, natural language processing, a combination thereof, or the like. The system may then redact (e.g., remove or obfuscate, replace, etc.) the identified entities, or any entities identified as personal, from the information document to generate the redacted information document.

Figure 2:
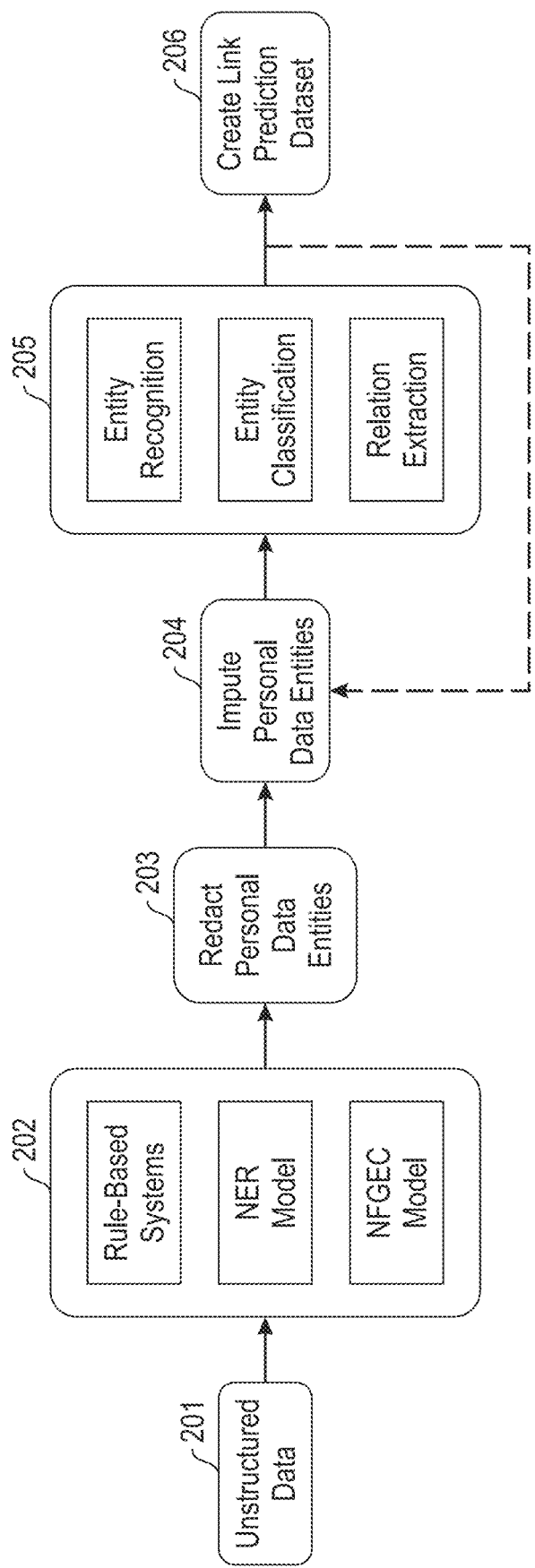
FIG. 2 illustrates an overall system architecture for generating a redacted information document from an unredacted information document and identifying entity types having relationships from the information document.

FIG. 2 illustrates a system architecture for generating the redacted information document from the unredacted document. The system receives unstructured data 201, for example, in the form of a document, publicly available information, or the like, and utilizes one or more entity extraction techniques (e.g., rule-based systems, named entity recognizer (NER) model, neural fine grained entity classification (NFGEC) model, etc.) 202 to identify entities within the unstructured data 201. The system then redacts personal data entities 203, thereby creating the redacted information document.

At 102 the system identifies an entity type for each redacted information span. An entity type identifies a classification or category of the entity represented by the information span. For example, an entity type may be a person, location, institution, date, object, idea, or the like. The general categories are referred to as coarse-grained entity classification. The system may also perform fine-grained entity classification which identifies a relationship between one information span and another information span or other entity within the information document. Example fine-grained entity classifications include daughter, son, spouse, date of origin, location of foundation, contributor, author, job position, place of employment, founders, artist, and the like. As can be seen from these examples, the fine-grained entity classifications indicate that the information span has a relationship to or with another entity or information span within the information document. Thus, the entity type may not only identify a category of the entity, but also identifies a relationship between an information span and another information span.

In the case that the system creates the redacted information document, the entity type can be identified before the information is redacted, for example, by performing a fine-grained entity classification on the unredacted information. The remaining portion of FIG. 2 illustrates how the entity type can be generated from the extracted and subsequently redacted information span. Personal data entries are imputed to or used to replace 204 the data entries that were redacted 203. These imputed personal data entries 204 are typed 205 using entity recognition, entity classification, and relation extraction techniques based upon the unredacted information. This typing is also utilized to evaluate the described system. If the imputations are normal or relatively correct, the performance on these typing tasks will be similar to the performance observed in unredacted documents. Since the relationships between entities is maintained and identified, a link prediction dataset 206 can be created that identifies links or relationships between the entities. If needed to control bias, as discussed further herein, the imputed data entries 204 may be modified and this can iteratively continue until a desired amount of bias is achieved.

On the other hand, in the case that the unredacted information is unknown, the system can still perform entity typing on the redacted information spans. The system may employ a neural network model that types the redacted span using three vectors, one representing the span, one representing the left context window, and one representing the right context window. These three vectors are represented as a token. A coarse-grained classification is performed on the tokens to classify the tokens based upon the context of the token. A classifier can be used to convert the coarse-grained classification entity types into fine-grained classification entity types. A neural network model can analyze the classification types and determine the accuracy of the coarse-grained classification. When the neural network model identifies a mistake or that the accuracy of the classification is below a predetermined threshold, the system can correct the classification. Language models can also be employed to improve the performance of the classification.

At 103 the system determines if a replacement entity can be generated for each of the redacted information spans. The system may determine that no replacement entity can be generated at 103 when an accuracy of the entity typing cannot reach a predetermined threshold. In the case that no replacement entity can be generated, the system may take no action with respect to the information span at 104. If, on the other hand, the system determines that a replacement entity can be generated at 103, the system may replace the redacted information span with replacement entities corresponding to the entity type of the redacted information span at 105.

When replacing the information span with a replacement entity, the system performs the replacing in view of a frequency distribution of actual information. In other words, the system, when generating replacement entities, attempts to make the replacement entities as realistic as possible. For example, using the example of replacing names, the most frequently used name within a particular geographical location will be maintained for replacement entities connected to that geographical location. In other words, not only does the system take into account a frequency distribution of a single information span, but it also takes into account a frequency distribution of the information in context with other replacement entities. For example, using the name example, when a location associated with the name is replaced with a different location, the frequency distribution for the different location will be utilized and not the frequency distribution for the original location.

Replacing the redacted information spans is also performed in a manner that maintains the relationships between the information spans as identified by the fine-grained entity classification. For example, if a last name of a child having the same last name as a parent is replaced with one name, the last name of the parent will also be replaced with the same name in order to maintain the relationship between the information spans. Thus, while all the replacement entities are randomly generated, the context of surrounding information and relationships will be maintained and the replacement entities will be representative of real-world information. Language models that predict entity masks, for example bidirectional transformers, can be utilized for predicting the replacement entities to maintain the context and relationships. Maintaining the context and relationships is achieved by introducing constraints on the language model output or by discarding language model output that does not conform to frequency distributions.

At 106 the system controls bias within the replacement entities. To control the bias the system detects bias within the replacement entities. To detect bias the system may convert the unstructured data of the information document having replacement entities into a structured dataset. The system can then utilize a structured data bias detector to detect bias within the structured dataset. For example, the system may flip protected variables within the structured dataset and observe if the output of benchmark tasks changes because of the flip. However, it should be noted that depending on the use case of the data, the bias may not be removed. In other words, the described system allows control of any bias meaning that a user can decide how much bias should be present within the dataset. Once the information document having replacement entities and having a desired amount of biased is generated, it can be used as desired, for example, as training data for a machine-learning model.

Figure 3:
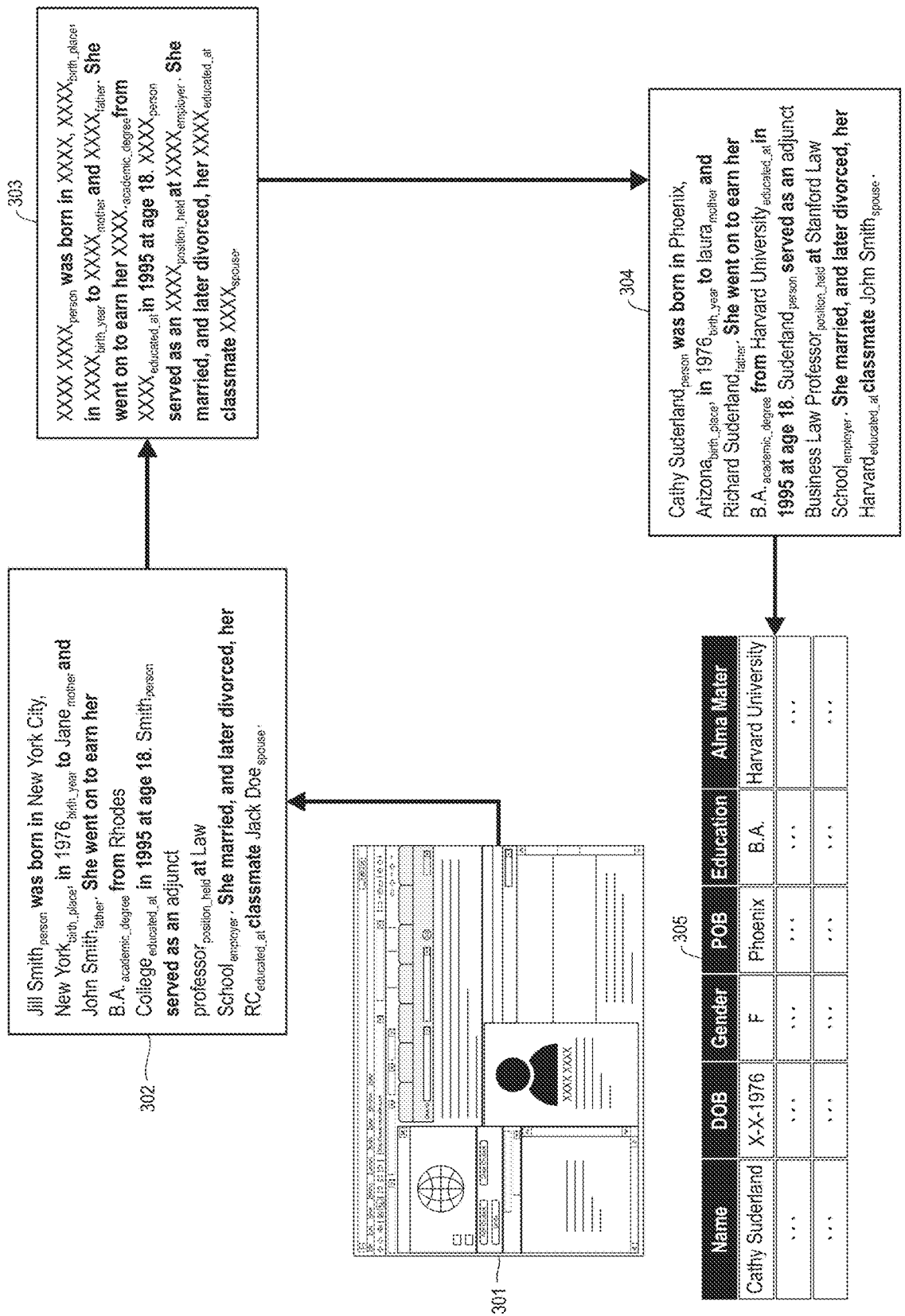
FIG. 3 illustrates an illustration of the conversion of an original document to a document having replacement entities and for controlling bias within the replacement entities.

FIG. 3 illustrates an example illustrates the conversion of an original document to a document having replacement entities and for controlling bias within the replacement entities. The original information document 301, for example, a publicly-available information document, is converted to text where entities within the information document are identified 302. Also, since the original information document 301 is available, the entities are fine-grained classified. The entities are then redacted to make a redacted information document 303. The redacted information document 303 may also be the starting point of the system in the case where the original document is unavailable. If the starting point is the redacted information document 303, the system performs entity typing on the redacted information spans. From the redacted information document 303, the system replaces the redacted information spans with replacement entities to create an information document having replacement entities 304. The system can then perform bias detection on the replacement entities by converting the information document having replacement entities 304 to a structured dataset 305.

Figure 4:
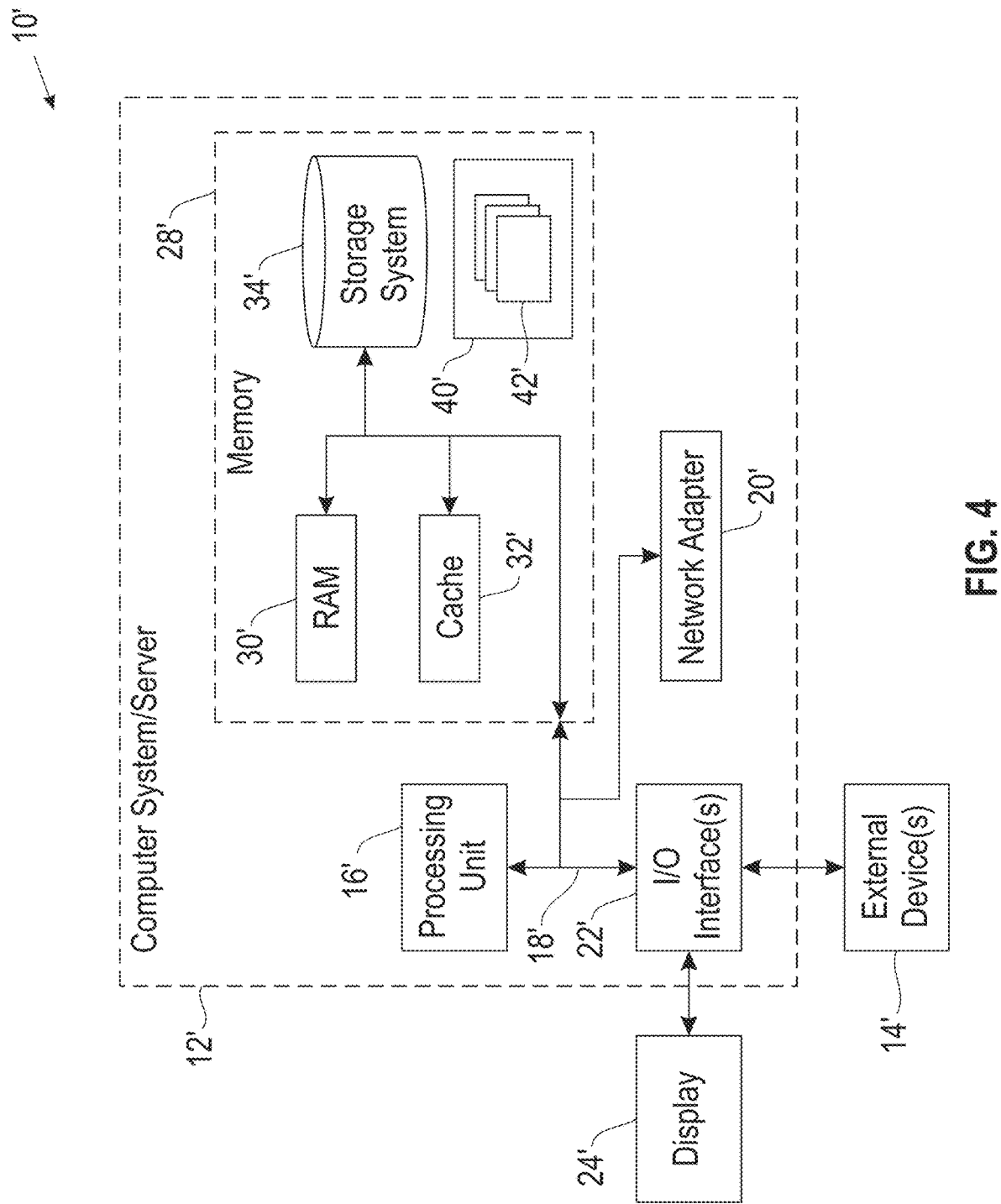
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, comprising:
obtaining an information document corresponding to an entity, wherein the information document comprises redacted information spans which redact sensitive or personal information in the information document;
identifying an entity type for each of the redacted information spans, the entity type related to an entire category of the information span, identifying the entity type by generating, using a neural network, at least three vectors for a given of the redacted information spans, one vector representing a left context window, one vector representing an information span, and one vector representing a right context window, the three vectors represented as a token and classified based upon context of the token;
replacing the redacted information spans with replacement entities corresponding to the entity type of a given redacted information span, wherein the replacing is performed in view of a frequency distribution of actual information in context with other replacement entities within the information document and wherein the replacing comprises maintaining relationships of the redacted information spans through the replacement entities by utilizing at least one language model to predict entity masks which maintain a context of the information document and relationships between information spans and introducing constraints on output of the language model to conform to the frequency distribution; and
generating, from at least the information document having the replaced redacted information spans, a training dataset used to train a machine-learning model.

2. The computer implemented method of claim 1, wherein the obtaining comprises obtaining a publicly available information document, converting the publicly available information document into a text-only information document, and redacting personal information included in the text-only information document.

3. The computer implemented method of claim 2, wherein the redacting comprises at least one of: a removal of the personal information and replacing the personal information.

4. The computer implemented method of claim 2, wherein the identifying an entity type comprises performing, using a neural network, fine-grained classification on the personal information before redaction.

5. The computer implemented method of claim 1, wherein the performing a classification on the token comprises performing a coarse grained classification.

6. The computer implemented method of claim 5, wherein the identifying an accuracy of the classifying comprises determining an accuracy of the coarse-grained classification.

7. The computer implemented method of claim 1, wherein the replacing comprises selecting a replacement entity for a redacted information span that maintains a context of surrounding text.

8. The computer implemented method of claim 1, wherein the replacing comprises predicting, using at least one language model and in view of constraints, an entity mask for each of the redacted information spans.

9. The computer implemented method of claim 1, wherein the detecting comprises evaluating the information document comprising the replacement entities, wherein the converting comprises converting unstructured data of the evaluated information document comprising the replacement entities into a structured dataset, and wherein the utilizing a bias detector comprises performing, using a structured data bias detector, bias detection on the structured dataset.

10. An apparatus, comprising:
at least one processor; and
a computer readable storage medium having computer readable program code embodied therewith and executable by the at least one processor:
wherein the computer readable program code is configured to obtain an information document corresponding to an entity, wherein the information document comprises redacted information spans which redact sensitive or personal information in the information document;
wherein the computer readable program code is configured to identify an entity type for each of the redacted information spans, the entity type related to an entire category of the information span, the entity type identified by generating, using a neural network, at least one three vectors for a given of the redacted information spans, one vector representing a left context window, one vector representing an information span, and one vector representing a right context window, the three vectors represented as a token and classified based upon context of the token;

wherein the computer readable program code is configured to replace the redacted information spans with replacement entities corresponding to the entity type of a given redacted information span, wherein the replacing is performed in view of a frequency distribution of actual information in context with other replacement entities within the information document and wherein the replacing comprises utilizing replacement entities that maintain relationships of the redacted information spans through the replacement entities by utilizing at least one language model to predict entity masks which maintain a context of the information document and relationships between information spans and introducing constraints on output of the language model to conform to the frequency distribution; and wherein the computer readable program code is configured to generate, from at least the information document having the replaced redacted information spans, a training dataset used to train a machine-learning model.

11. A computer program product, comprising:

a computer readable storage medium having computer readable program code embodied therewith, the computer readable program code executable by a processor:

wherein the computer readable program code is configured to obtain an information document corresponding to an entity, wherein the information document comprises redacted information spans which redacts sensitive or personal information in the information document;

wherein the computer readable program code is configured to identify an entity type for each of the redacted information spans, the entity type related to an entire category of the information span, the entity type identified by generating, using a neural network, at least three vectors for a given of the redacted information spans, one vector representing a left context window, one vector representing an information span, and one vector representing a right context window, the three vectors represented as a token and classified based upon context of the token;

wherein the computer readable program code is configured to replace the redacted information spans with replacement entities corresponding to the entity type of a given redacted information span, wherein the replacing is performed in view of a frequency distribution of actual information in context with other replacement entities within the information document and wherein the replacing comprises maintaining relationships of the redacted information spans through the replacement entities by utilizing at least one language model to predict entity masks which maintain a context of the information document and relationships between information spans and introducing constraints on output of the language model to conform to the frequency distribution; and wherein the computer readable program code is configured to generate, from at least the information document having the replaced redacted information spans, a training dataset used to train a machine-learning model.

12. The computer program product of claim 11, wherein the obtaining comprises obtaining a publicly available information document, converting the publicly available information document into a text-only information document, and redacting personal information included in the text-only information document.

13. The computer program product of claim 12, wherein the identifying an entity type comprises performing, using a neural network, fine-grained classification on the personal information before redaction.

14. The computer program product of claim 11, wherein the performing a classification on the token comprises performing a coarse-grained classification.

15. The computer program product of claim 14, wherein the identifying an accuracy of the classifying comprises determining an accuracy of the coarse-grained classification.

16. The computer program product of claim 11, wherein the replacing comprises selecting a replacement entity for a redacted information span that maintains a context of surrounding text.

17. The computer program product of claim 11, wherein the replacing comprises predicting, using at least one language model and in view of constraints, an entity mask for each of the redacted information spans.

18. The computer program product of claim 11, wherein the detecting comprises evaluating the information document comprising the replacement entities, wherein the converting comprises converting unstructured data of the information document comprising the replacement entities into a structured dataset, and wherein the utilizing a bias detector comprises performing, using a structured data bias detector, bias detection on the structured dataset.

* * * * *